US009600523B2

(12) United States Patent
Sankar et al.

(10) Patent No.: US 9,600,523 B2
(45) Date of Patent: Mar. 21, 2017

(54) EFFICIENT DATA COLLECTION MECHANISM IN MIDDLEWARE RUNTIME ENVIRONMENT

(75) Inventors: Raji Sankar, Bangalore (IN); Govinda Raj Sambamurthy, Bangalore (IN); Rahul Goyal, Bangalore (IN); Vinay Kumar Jaasti, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 175 days.

(21) Appl. No.: 13/009,781

(22) Filed: Jan. 19, 2011

(65) Prior Publication Data

US 2012/0185441 A1  Jul. 19, 2012

(51) Int. Cl.
*G06F 17/30* (2006.01)
*G06F 11/34* (2006.01)

(52) U.S. Cl.
CPC .... *G06F 17/30489* (2013.01); *G06F 11/3495* (2013.01); *G06F 11/3409* (2013.01); *G06F 2201/81* (2013.01); *G06F 2201/865* (2013.01)

(58) Field of Classification Search
CPC .................................................. G06F 17/30489
USPC ....................................... 707/602, 782, 687
See application file for complete search history.

(56) References Cited

U.S. PATENT DOCUMENTS

| 4,166,290 | A | 8/1979 | Furtman |
| 5,222,065 | A | 6/1993 | Krogmann |
| 5,257,358 | A | 10/1993 | Cohen |
| 5,958,009 | A * | 9/1999 | Friedrich et al. ............. 709/224 |
| 6,018,300 | A * | 1/2000 | Dowden et al. ............. 340/635 |
| 6,049,666 | A | 4/2000 | Bennett et al. |
| 6,549,521 | B1 | 4/2003 | Edwards et al. |
| 6,792,460 | B2 | 9/2004 | Oulu et al. |
| 6,954,779 | B2 | 10/2005 | Duggan et al. |
| 7,020,802 | B2 | 3/2006 | Gross et al. |
| 7,058,858 | B2 * | 6/2006 | Wong ................. G06F 11/0709 714/42 |
| 7,237,023 | B2 | 6/2007 | Menard et al. |
| 7,254,750 | B1 | 8/2007 | Okun |
| 7,424,530 | B2 | 9/2008 | Chagoly et al. |
| 7,493,234 | B2 | 2/2009 | Greco |
| 7,962,437 | B2 | 6/2011 | Brandenburg |
| 8,205,116 | B2 | 6/2012 | Yang et al. |
| 8,219,997 | B2 | 7/2012 | Shimizu et al. |
| 8,375,251 | B2 | 2/2013 | Ness |

(Continued)

*Primary Examiner* — Boris Gorney
*Assistant Examiner* — Bao Tran
(74) *Attorney, Agent, or Firm* — Tucker Ellis LLP (57) ABSTRACT

A mechanism for efficient collection of data is described for runtime middleware environments. Two frequencies are used, a collection frequency (CF) to collect the data and an aggregation frequency (AF) to aggregate and persist the data in a repository. The collection cycle is a shorter time interval than the aggregation cycle. An agent residing in the container periodically collects a set of data upon every collection cycle from the components of the middleware system and caches the set of data locally. Upon every aggregation cycle, the agent applies an aggregation function to the collected set of data and persists the set of data into a repository after the aggregation function has been applied. The aggregation function is such that it resulting data represents the behavior of the runtime environment in the total duration of the aggregation cycle.

20 Claims, 5 Drawing Sheets

(56) References Cited

U.S. PATENT DOCUMENTS

| | | |
|---|---|---|
| 8,458,530 B2 | 6/2013 | Kini |
| 8,631,280 B2 | 1/2014 | Sankar |
| 8,832,839 B2 | 9/2014 | Avritzer |
| 2001/0034663 A1* | 10/2001 | Teveler et al. ................... 705/26 |
| 2002/0184555 A1* | 12/2002 | Wong ................ G06F 11/0709 |
| | | 714/4.1 |
| 2005/0172306 A1 | 8/2005 | Agarwal et al. |
| 2005/0216781 A1 | 9/2005 | Doshi et al. |
| 2007/0168915 A1 | 7/2007 | Fabbio |
| 2009/0328119 A1* | 12/2009 | Kan ................... H04N 7/17318 |
| | | 725/107 |
| 2010/0169713 A1 | 7/2010 | Argue et al. |
| 2011/0145651 A1 | 6/2011 | Molnar et al. |
| 2011/0161048 A1 | 6/2011 | Sodem |
| 2012/0216205 A1* | 8/2012 | Bell et al. ..................... 718/102 |
| 2012/0284719 A1 | 11/2012 | Phan et al. |
| 2012/0304182 A1 | 11/2012 | Cho et al. |
| 2013/0290242 A1* | 10/2013 | Suzuki ......................... 707/600 |

* cited by examiner

EFFICIENT DATA COLLECTION MECHANISM IN MIDDLEWARE RUNTIME ENVIRONMENT

CROSS REFERENCE TO RELATED APPLICATIONS

This application is related to the following U.S. patent applications, each of which is incorporated by reference herein in its entirety:

U.S. patent application Ser. No. 13/009,775, filed Jan. 19, 2011, now U.S. Pat. No. 8,892,960, issued Nov. 18, 2014, entitled "SYSTEM AND METHOD FOR DETERMINING CAUSES OF PERFORMANCE PROBLEMS WITHIN MIDDLEWARE SYSTEMS";

U.S. patent application Ser. No. 13/009,778, filed Jan. 19, 2011, now U.S. Pat. No. 8,627,150, issued Jan. 7, 2014, entitled "SYSTEM AND METHOD FOR USING DEPENDENCY IN A DYNAMIC MODEL TO RELATE PERFORMANCE PROBLEMS IN A COMPLEX MIDDLEWARE ENVIRONMENT";

U.S. patent application Ser. No. 13/009,777, filed Jan. 19, 2011, now U.S. Pat. No. 8,631,280, issued Jan. 14, 2014, entitled "METHOD OF MEASURING AND DIAGNOSING MISBEHAVIORS OF SOFTWARE COMPONENTS AND RESOURCES"; and U.S. patent application Ser. No. 13/009,800, filed Jan. 19, 2011, now U.S. Pat. No. 8,600,725, issued Dec. 3, 2013, entitled "SYSTEM AND METHOD FOR PROVIDING A STATIC MODEL MAP OF BEHAVIORS IN A MIDDLEWARE SYSTEM, FOR USE IN IDENTIFYING SYSTEM PROBLEMS".

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The current invention relates generally to software diagnostics and middleware systems, and more particularly to more efficiently collecting data in a middleware system.

BACKGROUND

In recent years, an increasing number of e-commerce providers and business enterprises have come to rely on middleware and application server technology as the lifeblood of their business. For example, application servers form a proven foundation for supporting e-commerce applications, providing the presentation, business and information-access logic, security and management services, and underlying infrastructure needed for highly scalable and mission-critical software applications. These servers manage all of the underlying complexities of a company's applications, allowing the organization to focus instead on delivering new and innovative products and services.

With the rising use and pervasiveness of such middleware systems, it has become important for business enterprises to diagnose and resolve various errors, misbehaviors and other problems that may occur in this field. For example, a middleware system, such as an application server, typically uses multiple components and resources working together to service an incoming request. While serving a request, these systems may face performance problems in one or more components/services. For example, a request can be serviced by the co-working of Servlets, Enterprise Java Beans (EJBs) and data sources. The performance problem of such request can be due to non-availability of an EJB instance, non-availability of a JDBC connection and the like.

The performance of such middleware systems can be adjudged by evaluating performance metrics/indicators that are usually defined in terms of response times, throughputs or load on hardware such as central processing unit (CPU), Memory, Disk IO, etc. These metrics not only indicate the current state of the performance of the middleware system, but also depend on the number of users; size of the requests and amount of data processed and are limited by hardware such as CPU type, disk size, disk speed, and memory. Similarly, the containers within an application server out-of-box expose certain performance metrics, which indicate the current state of the underlying system. Such runtime data from the containers may include metrics such as response time, total load passing through each component, errors, etc.

An application that diagnoses performance problems in these middleware runtime environments analyzes from various datasets that are exposed by these components/services for problem analysis. To be able to find the component/service that is contributing to a performance problem such as slow response, these applications often need to collect data from dozens of sources like MBeans, Server logs, diagnostics framework provided by such middleware system and the like. For example, to diagnose a slow response of a request that involves accessing an EJB, the diagnostics application may need data about that particular EJB including response time metrics, EJB pool size from MBeans, and details about exceptions from server logs.

Thus, a typical diagnostics application in middleware management space polls different data sources at preconfigured frequency and obtains the data. Polling large numbers of data sources at high frequencies can produce a large amount of data and can cause strain on the network by the amount of data being transmitted. On the other hand, polling at lower frequencies may reduce the amount of data, however lower frequencies may not be enough to properly identify the problem. As such, it is desirable to reduce the amount of data being collected by diagnosis tools while still maintaining a level of accuracy to diagnose performance problems.

SUMMARY

In various embodiments, systems and methods are described for more efficient collection of data in runtime middleware environments. The system uses two frequencies, a collection frequency (CF) to collect the data and an aggregation frequency (AF) to aggregate and persist the data in a repository. The collection cycle is a shorter time interval than the aggregation cycle. An agent residing in the container periodically collects a set of data upon every collection cycle from the components of the middleware system and caches the set of data locally. Upon every aggregation cycle, the agent applies an aggregation function to the collected set of data and persists the set of data into a repository after the aggregation function has been applied. The aggregation function is such that the resulting data represents the behavior of the runtime environment in the total duration of the aggregation cycle. For example, the aggregation function can take the average ratio of the number of requests that completed execution to the total number of requests. The data collection mechanism thus collects performance data which is low in volume and still accurate in diagnosing performance problems.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

In accordance with various embodiments, the mechanism for efficient collection of data can be implemented in a software middleware system, such as an application server. Other types of middleware systems can also be utilized in conjunction with the various embodiments described herein, such as web servers, business process management (BPM) and process execution systems, enterprise service buses, service access gateways, messaging brokers and messaging systems, and the like.

Definitions

In accordance with an embodiment, as used herein, the term "efficiency" is used to refer to a computation with no units, and normalized against load. It is defined as the ratio of the number of requests in this sampling period that completed execution within the sampling period to the total number of requests that came in for processing in this sampling period. Though it is normalized against load, it will vary with load if load affected the behavior of the component and stay constant if not.

In accordance with an embodiment, as used herein, the term "inefficiency" is used to refer to the inverse of efficiency. It is defined as the ratio of the number of requests in this sampling period that is still executing at the end of this sampling period to the total number of requests that came in for processing in this sampling period.

In accordance with an embodiment, as used herein, the terms "performance indicator," "performance metric" and/or "performance indicator/metric" are used interchangeably to refer to any metric characterizing the response time, throughput or load on hardware or software components in a system.

In accordance with an embodiment, as used herein, the term "bottleneck" is used to refer to any situation in which performance of a system is diminished or otherwise compromised due to the poor performance of one or more components. The component or components causing the bottleneck are referred to herein as "bottleneck components."

In accordance with an embodiment, as used herein, the term "model" is used to refer to a hierarchical representation of the relations between components within middleware systems. A model can include a static hierarchy of component types, which is predefined or predetermined during the design phase, and dynamic relations, which are established between component instances during runtime.

In accordance with an embodiment, as used herein, the term "problem tree" is used to refer to a runtime instance of a model, represented as a tree of related components that exhibit performance problems at runtime. The components in a problem tree may or may not be "effects" of one another.

In accordance with an embodiment, as used herein, the term "link probability" is used to refer to a measure of co-occurrence of performance problems within components, which are known to be related to each other, by virtue of their links in a problem tree.

Figure 1:
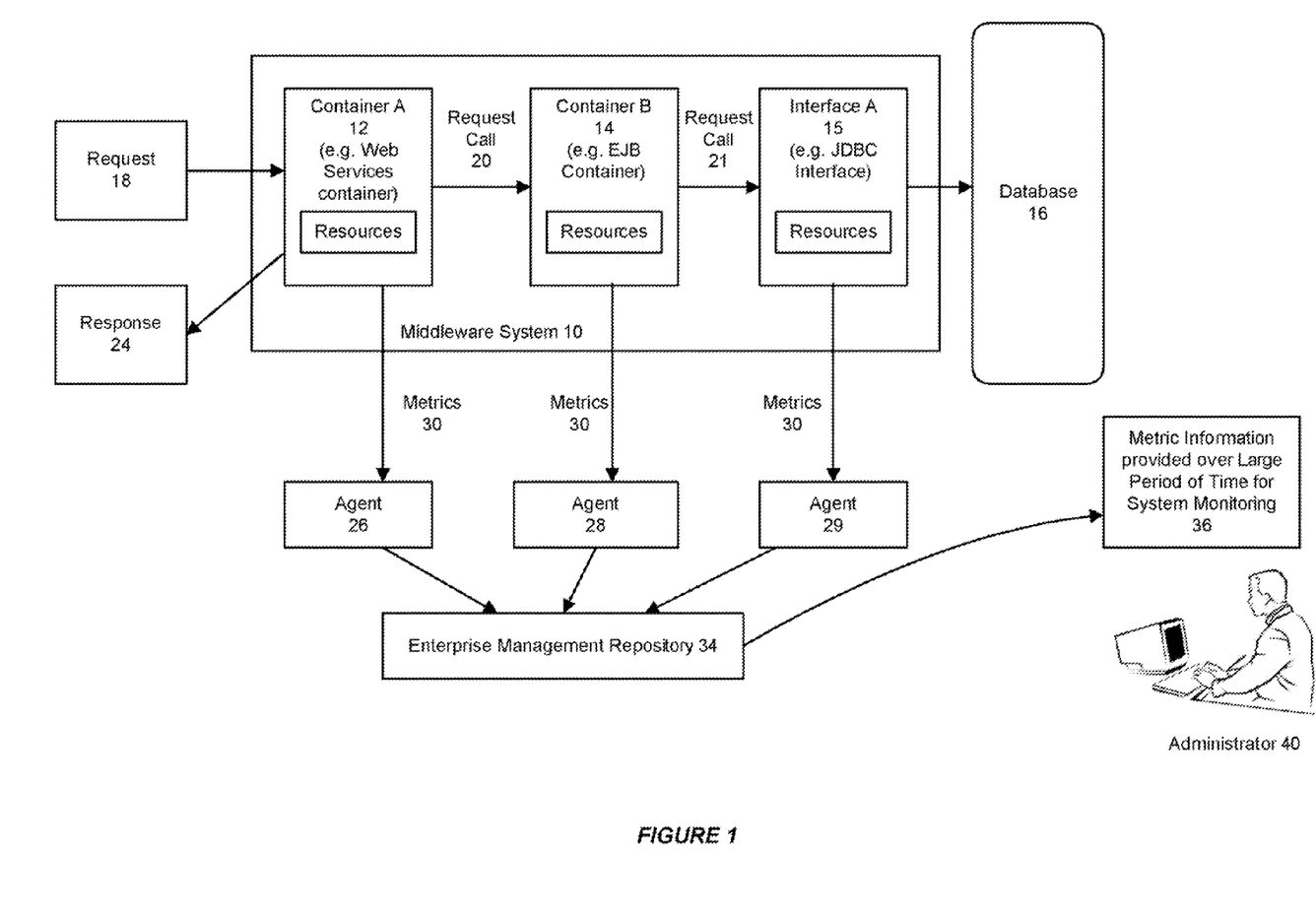
FIG. 1 illustrates a system, such as a middleware system, in accordance with an embodiment of the invention.

FIG. 1 illustrates a system, such as a middleware system, in accordance with an embodiment. As shown in FIG. 1, a typical middleware system 10 includes a plurality of resources, which in turn can be provided within containers 12, 14, such as Web Services or EJB containers, or as interfaces 15, such as a JDBC interface. A typical middleware system can also include a database 16, or provide access to one or more external databases. When a request 18 is received at the system, these resources are successively called or otherwise used 20, 21, to allow the system to eventually respond 24 to the request. Typically, individual resource usage information can be collected from the containers and interfaces by a plurality of agents 26, 28, 29 that are associated with the various containers and interfaces. The resource usage information or metrics 30 can be stored or otherwise provided to an enterprise manager repository 34. The information in the enterprise manager repository thus reflects an overview of metric information for the system over a relatively large period of time 36, and as such is useful for system monitoring by a system administrator 40. However, this form of metric information is of less use in identifying system problems when they occur.

Figure 2:
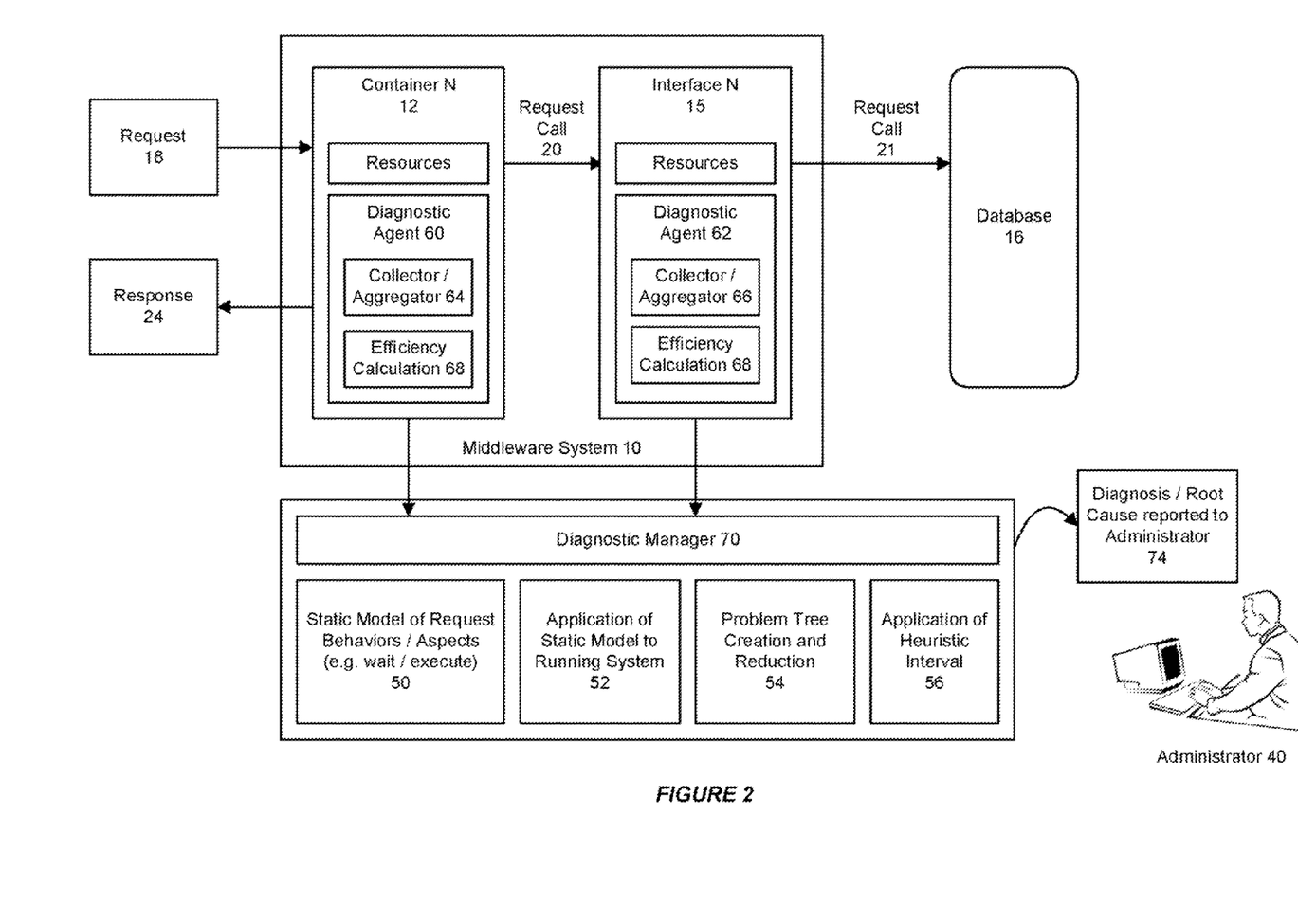
FIG. 2 illustrates a more detailed view of a system, such as a middleware system, in accordance with an embodiment of the invention.

FIG. 2 illustrates a more detailed view of a system, such as a middleware system, in accordance with an embodiment. As shown in FIG. 2, the middleware system again includes a plurality of resources provided, e.g. as containers or interfaces, and again includes or provides access to one or more databases. In accordance with an embodiment, the system can allow definition of one or more of a static model of request behaviors 50, and allow application of the static model 52, to define behaviors within the current system configuration that are of most interest in problem identification (such as potential resource bottlenecks, or patterns of resource behavior that indicate potential problems). In accordance with an embodiment, a plurality of diagnostic agents 60, 62, coupled with collector/aggregators 64, 66, and a diagnostic manager 70, can provide information describing the runtime "efficiency" of a particular resource, within the context of this system. This information can then be used in combination with a problem tree 54, and heuristic interval 56, to provide diagnosis or the "root cause" 74 of a particular current system problem to the system administrator.

As described above, middleware systems are typically comprised of multiple components that service incoming requests. An application that diagnoses performance problems in these middleware runtime environments analyzes from various datasets that are exposed by these components/services for problem analysis. To be able to find the component/service that is contributing to a performance problem such as slow response, these applications need to collect data from a plurality of sources, including but not limited to Java Management Extension (JMX) managed beans (MBeans), Server logs, diagnostics framework provided by such middleware system, and the like. For example, to diagnose a slow response of a request that involves accessing an Enterprise Java Bean (EJB), the diagnostics application needs data about that particular EJB including response time metrics, EJB pool size from MBeans, and details about exceptions from server logs.

A typical diagnostics application in middleware management space polls different data sources at preconfigured frequency and obtains the data. For example, if an application has 100 EJBs deployed, and if each EJB has data in the order of Kilobytes (KB) from various performance metrics, then EJB container alone exposes data in the order of Megabytes (MB). Considering various components/services in a middleware system, the data that needs to be collected in each cycle can be very high in volume.

Another factor for analyzing performance and catching performance issues in real time is that it is useful when the data collection is at a high frequency. Typically, the closer the data collection times are, the higher the accuracy of the solution. Also, the collection interval should be as close to the expected response time as to catch the performance issues with greater accuracy. For example, in today's scenario, when response time expectation from customers is in the range of sub 5 seconds, a diagnostic solution will need to capture these samples in 3-5 sec interval.

As one illustration, an application server container may have 50 EJBs that need to be diagnosed. EJBs have two aspects for which data is collected (wait and execution). The collection frequency of the data collector is 5 seconds. Assuming that each sample generates about 50B of data, the raw data that is collected is:

50B*2aspects*50EJBs=5000B per collection for all aspects of all EJBs.

This translates to 5000B*720 collections/hr=3600000Bytes/hr for all aspects of all EJBs. Therefore, the diagnostics application would be generating about 3.6MB of raw EJB analysis data every hour for every instance of the application server.

An interesting situation arises wherein low frequency data collection doesn't provide the required accuracy to detect a problem and high frequency data collection, while providing the required accuracy, adds a burden on transporting this data to the central diagnostic repository.

In accordance with an embodiment, since it may not be possible or useful to work with low frequency data, the solution described herein addresses the data volume issue. If not addressed, it can lead to memory hogging in the application server container and cause performance issues of its own, thereby rendering the solution impractical.

In accordance with an embodiment, the problems to solve in data collection for a diagnostics application in middleware systems include:

Sampling at high frequency and holding the data in a format such that it does not take up too much of resources within the container; and Transporting the data across the network, so there is not high network load and network lag to push the data from container to the systems management database.

In accordance with the various embodiments, the diagnostic solution provides a data collection mechanism that collects and uploads data without causing noticeable overhead while providing the required data accuracy to detect problems. In accordance with an embodiment, instead of collecting and uploading the raw data at a single preconfigured frequency, the data collection mechanism described herein uses two different frequencies, namely collection frequency (CF) and aggregation frequency (AF). In accordance with an embodiment, the CF is a shorter time interval (typically 3-5 seconds but configurable) and is used to sample and collect data related to the component aspects. The AF is a larger time interval (typically 5 minutes but configurable) during which the aggregator will work of the raw data that was collected. The aggregator processes the raw data to compute diagnostic indicators such as efficiency of each collected sample, the number of violations and the average efficiency during the aggregation interval. By returning only this processed data back to the central diagnostic repository, the amount of data that needs to flow on the wire is reduced, while still maintaining the required accuracy for problem detection.

For example, assuming that each aggregation results in about 50B of data and an aggregation interval of 5 min the new size of the data that is collected works out to be 50B*2aspects*50EJBs*12=60 KB/hr for all aspects of all EJBs. Thus, by applying the above solution the amount of data generated is reduced from 3.6MB/hr to 60KB/hr while maintaining the data accuracy required for problem detection. In addition, the memory footprint used by the collector is also reduced. With aggregation memory only needs to hold raw data for one aggregation cycle. This memory can then be reused in the next aggregation cycle.

It is noted that throughout this disclosure, the terms collection frequency and collection cycle mean the same thing and are used interchangeably. Similarly, the terms aggregation frequency and aggregation cycle also mean the same thing and are also used interchangeably.

Figure 3:
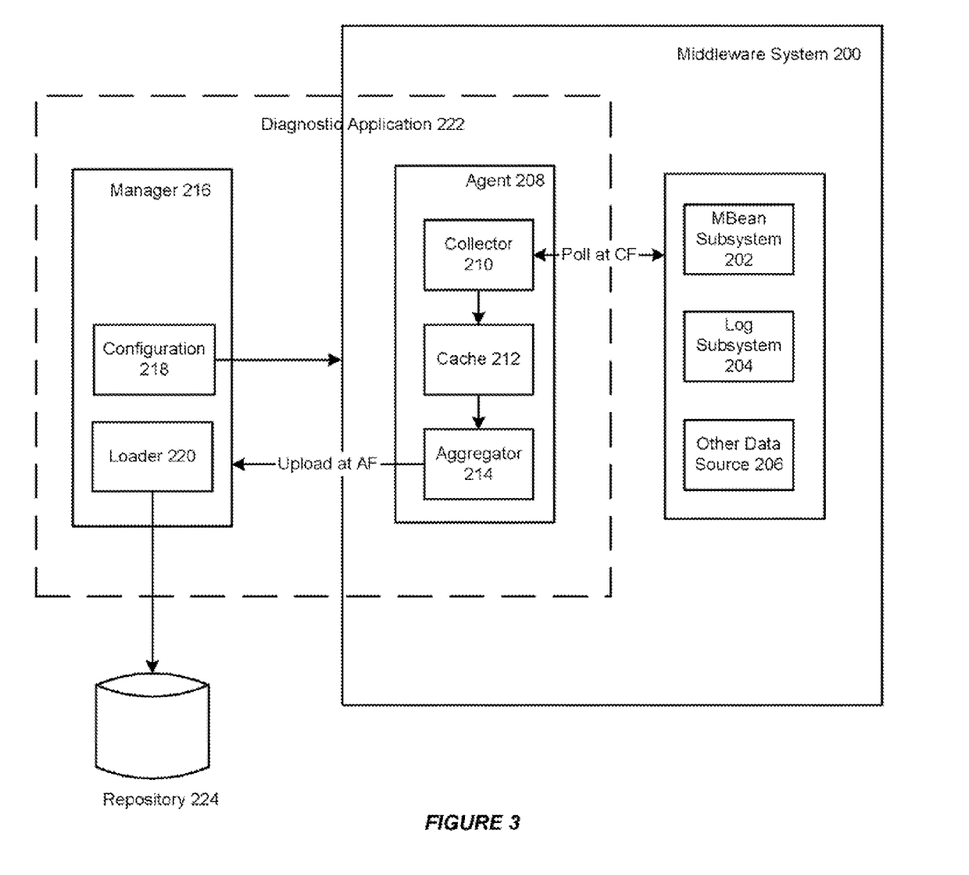
FIG. 3 is an illustration of the data collection mechanism, in accordance with various embodiments of the invention.

FIG. 3 is an illustration of the data collection mechanism, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the diagnostic application 222 includes an agent 208 that can be deployed within the container of an application server or other middleware system 200. The agent includes a collector 210 that periodically polls the various components of the application server upon each collection frequency (collection cycle). The components polled can be any component of the application that acts as a data source, such as an MBean subsystem 202, Log subsystem 204 and other data sources 206.

In addition to the collector, the agent includes a local cache 212 that temporarily stores the data collected during the collection cycle. In accordance with an embodiment, the aggregator 214 applies an aggregation function to the data in the cache and uploads the aggregated data to the manager upon each aggregation cycle for persistent storage. The manager includes a loader 220 that stores the aggregated data into a repository 224. In accordance with an embodiment, the manager can also include a configuration component that can be used to configure the diagnostic application, such as configuring the aggregation frequency, the collection frequency and the like.

In accordance with an embodiment, the aggregation function can take the average number of requests that were processed during the aggregation cycle out of the total requests. For example, if a metric M indicates total number of requests waiting to get an EJB instance at any point of time t, the proposed data collector collects this $M_t$ in each collection cycle ($m_1$, $m_2$, $m_3$) and applies average( ) as its aggregation function. The calculated average of this metric in each aggregation cycle still represents M's behavior for that duration without losing precision.

Considering a Java Database Connectivity (JDBC) component, a diagnostic application 222 can derive various performance indicators like efficiency, average wait time for a data source, etc., from the metric values. For example, if the diagnostics application needs to calculate efficiency of a wait pool for a given data source, it can apply aggregation function Requests Completed/(Requests Completed+Requests Waiting) on the raw data that is cached and collected (which is represented in Table 1 illustrated below) to get the efficiency indicator for each collection cycle (Table 2 illustrated below). Further, if this calculated efficiency is aggregated by applying another function average( ) over a period of aggregation cycle, the resulting data is very low in volume (Table 3) and still represents the behavior of that JDBC component with respect to efficiency.

Table 1 shown below represents the raw data sampled by the diagnostics application every 5 seconds for a 1 minute duration (12 samples).

TABLE 1

| Current Requests waiting for connection | Current Requests failed to get connection | Requests succeeded to get connection | Total Requests waited for connection | Current active connection |
|---|---|---|---|---|
| 0 | 0 | 1 | 0 | 2 |
| 7 | 0 | 4 | 7 | 5 |
| 17 | 28 | 4 | 31 | 5 |
| 17 | 62 | 4 | 48 | 5 |
| 15 | 96 | 4 | 63 | 5 |
| 4 | 118 | 4 | 63 | 5 |
| 14 | 128 | 4 | 78 | 5 |
| 15 | 156 | 4 | 93 | 5 |
| 15 | 186 | 4 | 108 | 5 |
| 11 | 216 | 4 | 119 | 5 |
| 0 | 238 | 4 | 119 | 5 |
| 11 | 238 | 4 | 130 | 5 |

Table 2 shown below illustrates the efficiency computed for each sample of raw data. As illustrated in Table 2, the diagnostics application can also monitor the violations of efficiency, such as when the computed efficiency fell below a certain threshold. In accordance with the embodiment, the threshold can also be made configurable.

TABLE 2

| Requests Completed | Requests Waiting | Efficiency | Is Violation |
|---|---|---|---|
| 1 | 0 | 100 | N |
| 4 | 7 | 36.36 | Y |
| 4 | 17 | 19.05 | Y |
| 4 | 17 | 19.05 | Y |
| 4 | 15 | 21.05 | Y |
| 4 | 4 | 50 | N |
| 4 | 14 | 22.22 | Y |
| 4 | 15 | 21.05 | Y |
| 4 | 15 | 21.05 | Y |
| 4 | 11 | 26.67 | Y |
| 4 | 0 | 100 | N |
| 4 | 11 | 26.67 | Y |

Table 3 shown below illustrates the average efficiency across all the collected samples in Table 1 and Table 2. As shown in Table 3, the aggregation function can also include the violation count of when efficiency fell below the predetermined threshold.

TABLE 3

| Average Requests Completed | Average Requests Waiting | Average Efficiency | Violation Count |
|---|---|---|---|
| 3.75 | 10.5 | 38.5975 | 9 |

Thus, as illustrated in the tables above, using two different frequencies and aggregated data, the data collection mechanism collects performance data which is low in volume and still accurate enough to diagnose the performance problems.

Figure 4:
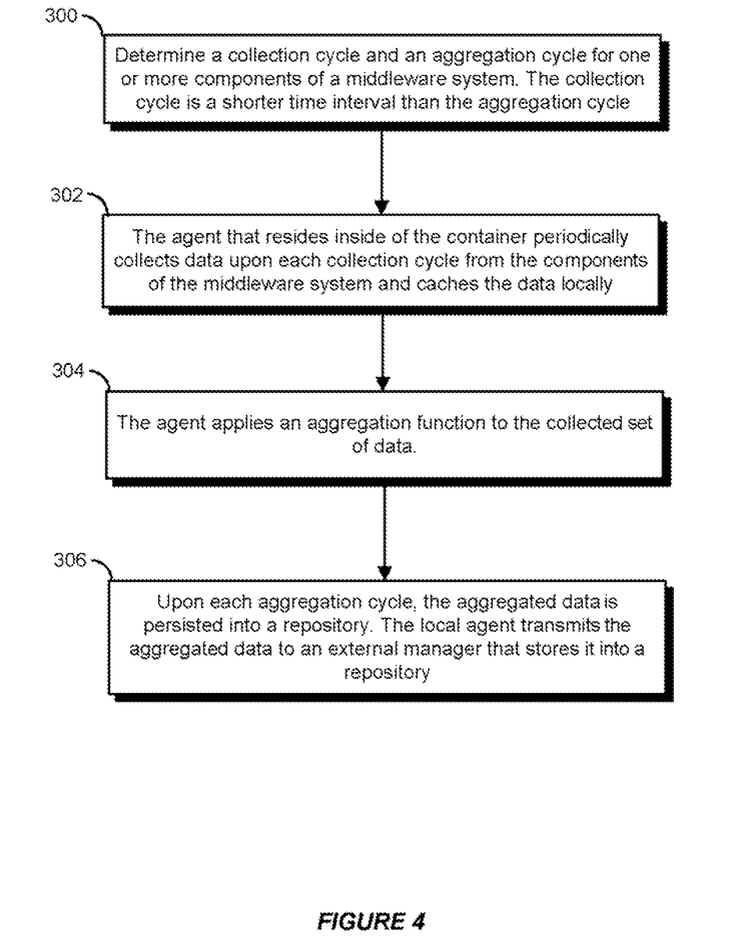
FIG. 4 is a flow chart diagram of efficient data collection, in accordance with various embodiments of the invention.

FIG. 4 is a flow chart diagram of a method for efficient data collection, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 300, the diagnostics application can determine a collection cycle and an aggregation cycle for one or more components of a middleware system. In accordance with an embodiment, the cycles can be made configurable and can be input by a system administrator or other user. In accordance with other embodiments, they can be automatically determined by the diagnostics application. In accordance with an embodiment, the collection cycle is a shorter time interval than the aggregation cycle.

In step 302, an agent residing inside of the container periodically collects data upon expiration of each collection cycle from the components of the middleware system. The agent can then cache the data locally. In step 304, upon each aggregation cycle, the agent applies an aggregation function to the collected set of data and in step 306, the aggregated data is persisted into a repository. In accordance with an embodiment, the local agent transmits the aggregated data to an external manager that stores it into a repository.

Figure 5:
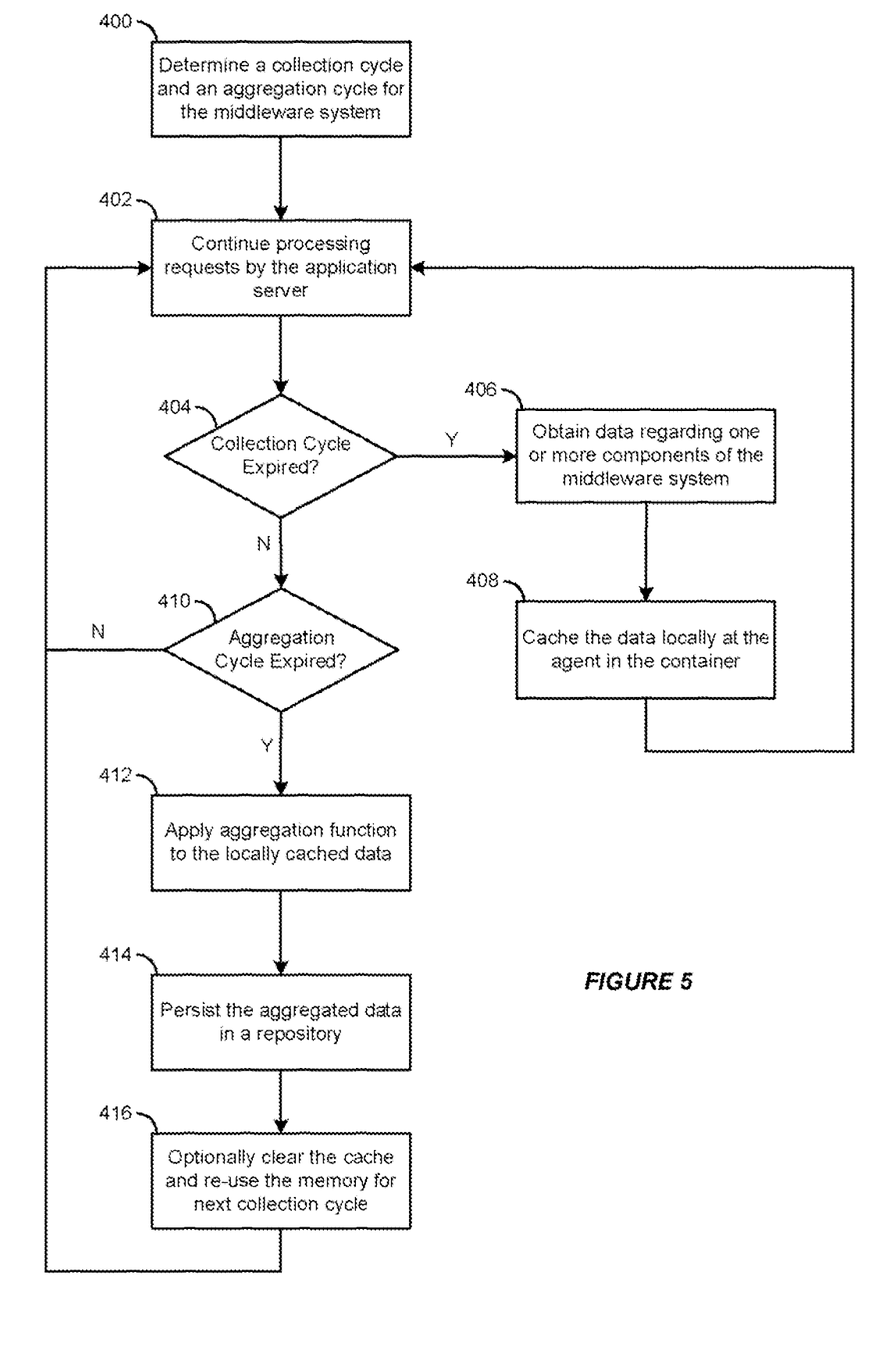
FIG. 5 is another flow chart diagram of efficient data collection, in accordance with various embodiments of the invention.

FIG. 5 is another flow chart diagram of a method for efficient data collection, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 400, the diagnostics application can determine an appropriate collection cycle and aggregation cycle for the component being monitored. In step 402, the middleware system (e.g. an application server) continues to process incoming requests. In step 404, the diagnostics agent determines whether collection cycle expired. If the collection cycle has expired, the agent polls the component data source for the appropriate data (step 406) and caches the data locally (step 408).

In step 410, the agent determines when the aggregation cycle has expired. If the aggregation cycle has expired, the agent applies an aggregation function to the locally cached data (step 412) and the aggregated data is persisted in a repository (step 414). In step 416, the local cache can optionally be cleared and/or reused for the next collection cycle in order to reduce the memory footprint of the diagnostic application.

The present invention can be conveniently implemented using one or more conventional general purpose or specialized digital computer, computing device, machine, or microprocessor, including one or more processors, memory and/or non-transitory computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a computer readable storage medium (media) having instructions stored thereon/in which can be used to program a computer to perform any of the processes of the present invention. The computer readable storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for performance data collection in a middleware runtime environment operating on one or more microprocessors, said method comprising:
providing a software application server executed by the one or more microprocessors, the software application server comprising a particular container, the particular container comprising a diagnostic agent, wherein the diagnostics agent includes a collector, a local cache, and an aggregator;
determining a collection cycle and an aggregation cycle for the particular container, wherein the collection cycle is a shorter time interval than the aggregation cycle;
periodically collecting, via the collector of the diagnostics agent, a sample of raw performance data upon an expiration of the collection cycle from the particular container and storing the sample of raw performance data in the local cache of the diagnostics agent, wherein the local cache includes a plurality of samples of raw performance data upon an expiration of the aggregation cycle;
generating, via the aggregator of the diagnostics agent, aggregated performance data for each aggregation cycle by applying a plurality of aggregation functions to the plurality of samples of raw performance data in the local cache upon the expiration of the aggregation cycle, wherein the aggregated performance data includes
a plurality of sample efficiencies, each sample efficiency representing a ratio of requests that have completed to requests received by the particular container in a collection cycle,
an indicator for each sample efficiency, wherein the indicator indicates whether that sample efficiency is below a first threshold value, a violation count that represents a number of collection cycles, wherein each of the number of collection cycles is associated with a sample efficiency below a second threshold value, and
an average efficiency that represents an average of the plurality of sample efficiencies;
transmitting the aggregated performance data to a manager component external to the particular container, wherein the manager component persists the -aggregated performance data into a repository;
clearing the local cache for storing samples of raw performance data for a next aggregation cycle.

2. The method of claim 1, wherein the collection cycle and the aggregation cycle are configurable.

3. The method of claim 1, wherein the aggregated performance data possesses a reduced size compared to the plurality of samples of raw performance data, while maintaining data accuracy for problem detection.

4. The method of claim 1, wherein clearing the local cache after persisting the aggregated performance data upon each aggregation cycle reduces memory footprint of a diagnostics application of the software application server.

5. The method of claim 1, the particular container is one of an Enterprise Java Bean (EJB) container, a web services container, or a Java Database Connectivity (JDBC) connectivity component.

6. The method of claim 1, wherein the aggregated performance data is configured to be used together with a runtime instance of a hierarchical representation of relationships between containers in the software application server, to provide diagnosis to a particular problem to the software application server.

7. A system for performance data collection in a middleware runtime environment, said system comprising:
one or more microprocessors;
a software application server executed by the one or more microprocessors, the software application server comprising a particular container, the particular container comprising a diagnostics agent, wherein the diagnostics agent, which includes a collector, a local cache, and an aggregator, operates to
periodically collect, via the collector, a sample of raw performance data upon an expiration of the collection cycle from the particular container and store the sample of raw performance data in the local cache, wherein the local cache includes a plurality of samples of raw performance data upon an expiration of the aggregation cycle,
generate, via the aggregator, aggregated performance data for each aggregation cycle by applying a plurality of aggregation functions to the plurality of samples of raw performance data in the local cache upon the expiration of the aggregation cycle, wherein the aggregated performance data includes
a plurality of sample efficiencies, each sample efficiency representing a ratio of requests that have completed to requests received by the particular container in a collection cycle,
an indicator for each sample efficiency, wherein the indicator indicates whether that sample efficiency is below a first threshold value,
a violation count that represents a number of collection cycles, wherein each of the number of collection cycles is associated with a sample efficiency below a second threshold value, and
an average efficiency that represents an average of the plurality of sample efficiencies,
transmit the aggregated performance data to a manager component outside of the particular container, wherein the manager component persists the aggregated performance data into a repository, and
clear the local cache for storing samples of raw performance data for a next aggregation cycle.

8. The system of claim 7, wherein the aggregated performance data is employed to detect potential problems in the software application server.

9. The system of claim 7, wherein the collection cycle and the aggregation cycle are configurable.

10. The system of claim 7, wherein the aggregated performance data possesses a reduced size compared to the plurality of samples of raw performance data, and while maintaining data accuracy for problem detection.

11. The system of claim 7, wherein clearing the local cache after persisting the aggregated performance data upon each aggregation cycle reduces memory footprint of a diagnostics application of the software application server.

12. The system of claim 7, wherein the particular container is one of an Enterprise Java Bean (EJB) container, a web services container, or a Java Database Connectivity (JDBC) connectivity component.

13. The system of claim 7, wherein the aggregated performance data is configured to be used together with a runtime instance of a hierarchical representation of relationships between containers in the software application server, to provide diagnosis to a particular problem to the software application server.

14. A non-transitory computer readable storage medium storing one or more sequences of instructions, said instructions when executed by one or more processors, causing the one or more processors to perform the steps comprising:
providing a software application server executed by the one or more microprocessors, the software application server comprising a particular container, the particular container comprising a diagnostic agent, wherein the diagnostics agent includes a collector, a local cache, and an aggregator;
determining a collection cycle and an aggregation cycle for the particular container, wherein the collection cycle is a shorter time interval than the aggregation cycle;
periodically collecting, via the collector of the diagnostics agent, a sample of raw performance data upon an expiration of the collection cycle from the particular container and storing the sample of raw performance data in the local cache of the diagnostics agent, wherein the local cache includes a plurality of samples of raw performance data upon an expiration of the aggregation cycle;
generating, via the aggregator of the diagnostics agent, aggregated performance data for each aggregation cycle by applying a plurality of aggregation functions to the plurality of samples of raw performance data in the local cache upon the expiration of the aggregation cycle, wherein the aggregated performance data includes
a plurality of sample efficiencies, each sample efficiency representing a ratio of requests that have completed to requests received by the particular container in a collection cycle,
an indicator for each sample efficiency, wherein the indicator indicates whether that sample efficiency is below a first threshold value,
a violation count that represents a number of collection cycles, wherein each of the number of collection cycles is associated with a sample efficiency below a second threshold value, and
an average efficiency that represents an average of the plurality of sample efficiencies;
transmitting the aggregated performance data to a manager component external to the particular container, wherein the manager component persists the aggregated performance data into a repository;
clearing the local cache for storing samples of raw performance data for a next aggregation cycle.

15. The non-transitory computer readable storage medium of claim 14, wherein the aggregated performance data is employed to detect potential problems in the software application server.

16. The non-transitory computer readable storage medium of claim 14, wherein the collection cycle and the aggregation cycle are configurable.

17. The non-transitory computer readable storage medium of claim 14, wherein the aggregated performance data possesses a reduced size compared to the plurality of samples of raw performance data, and while maintaining data accuracy for problem detection.

18. The non-transitory computer readable storage medium of claim 14, wherein clearing the local cache after persisting the aggregated performance data upon each aggregation cycle reduces memory footprint of a diagnostics application of the software application server.

19. The non-transitory computer readable storage medium of claim 14, wherein the particular container is one of an Enterprise Java Bean (EJB) container, a web services container, or a Java Database Connectivity (JDBC) connectivity component.

20. The non-transitory computer readable storage medium of claim 14, wherein the aggregated performance data is configured to be used together with a runtime instance of a hierarchical representation of relationships between containers in the software application server, to provide diagnosis to a particular problem to the software application server.

* * * * *

UNITED STATES PATENT AND TRADEMARK OFFICE
CERTIFICATE OF CORRECTION

PATENT NO. : 9,600,523 B2  
APPLICATION NO. : 13/009781  
DATED : March 21, 2017  
INVENTOR(S) : Raji Sankar

Page 1 of 1

It is certified that error appears in the above-identified patent and that said Letters Patent is hereby corrected as shown below:

In the Specification

Column 1, Line 16: delete "13/009,778" and insert --13/009,788--.

Signed and Sealed this
Twenty-seventh Day of August, 2019

Andrei Iancu
*Director of the United States Patent and Trademark Office*